Aug. 20, 1946.　　　M. S. GETTIG ET AL　　　2,405,947
ESCAPEMENT MECHANISM
Filed April 24, 1944　　　2 Sheets-Sheet 1

INVENTORS
Martin S. Gettig,
Harold E. Engelbaugh.
BY George K. Hilbert
ATTORNEY

WITNESS
F. J. Hartman.

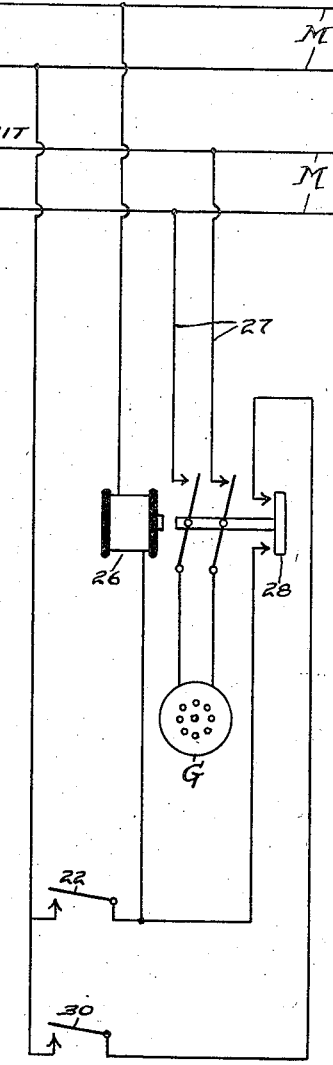

Patented Aug. 20, 1946

2,405,947

UNITED STATES PATENT OFFICE 2,405,947

ESCAPEMENT MECHANISM

Martin S. Gettig, Poland, and Harold E. Engelbaugh, Youngstown, Ohio, assignors to The Youngstown Sheet and Tube Company, Youngstown, Ohio, a corporation of Ohio Application April 24, 1944, Serial No. 532,420

3 Claims. (Cl. 198—23)

In the production of pipe, tubes and other elongated cylindrical articles, herein generically termed "pipes," use is frequently made of chain conveyors for moving the pipes consecutively from one point to another, these conveyors essentially comprising a pair of spaced parallel shafts, one of which is suitably driven as by a motor, on which at intervals are mounted sprockets between the aligned pairs of which extend chains in turn provided with series of spaced transversely aligned paddles which form pockets for the reception of the pipes as they are fed to the conveyor by appropriate feed mechanism such as fingers disposed at intervals along a shaft which are effective when the latter is rotated to lift each pipe from a support and throw it onto the ends of spaced skids down which it moves toward the conveyor. But as the latter is in constant motion there is no assurance that the pipe will reach it at the proper time to enter one of its pockets and it therefore frequently happens that instead of doing so the pipe strikes the ends of the paddles which tends to damage the mechanism and interferes with the smooth and regular flow of pipes to the conveyor.

The principal object of the invention therefore is the provision in operative association and combination with a chain conveyor designed to carry pipes laterally in a predetermined path, of escapement mechanism adapted to insure proper registration with the conveyor pockets of a series of pipes as they are consecutively delivered to the conveyor and which also obviates piling up of the pipes adjacent the conveyor if for any reason they are fed too rapidly to the skids.

A further object is the provision of mechanism of this character which operates automatically in properly timed relation with the movement of the conveyor.

Other objects, advantages and novel features of construction and arrangement comprehended by our invention are hereinafter more particularly pointed out or will be apparent to those skilled in the art from the following description of a preferred embodiment thereof in operative combination and association with a chain conveyor of the character disclosed in our pending application for U. S. Letters Patent Serial No. 481,588, filed April 2, 1943, of which this application is a continuation-in-part, reference being had to the accompanying drawings in which:

Fig. 3 is a schematic diagram of the electrical circuit preferably employed.

Figure 1:
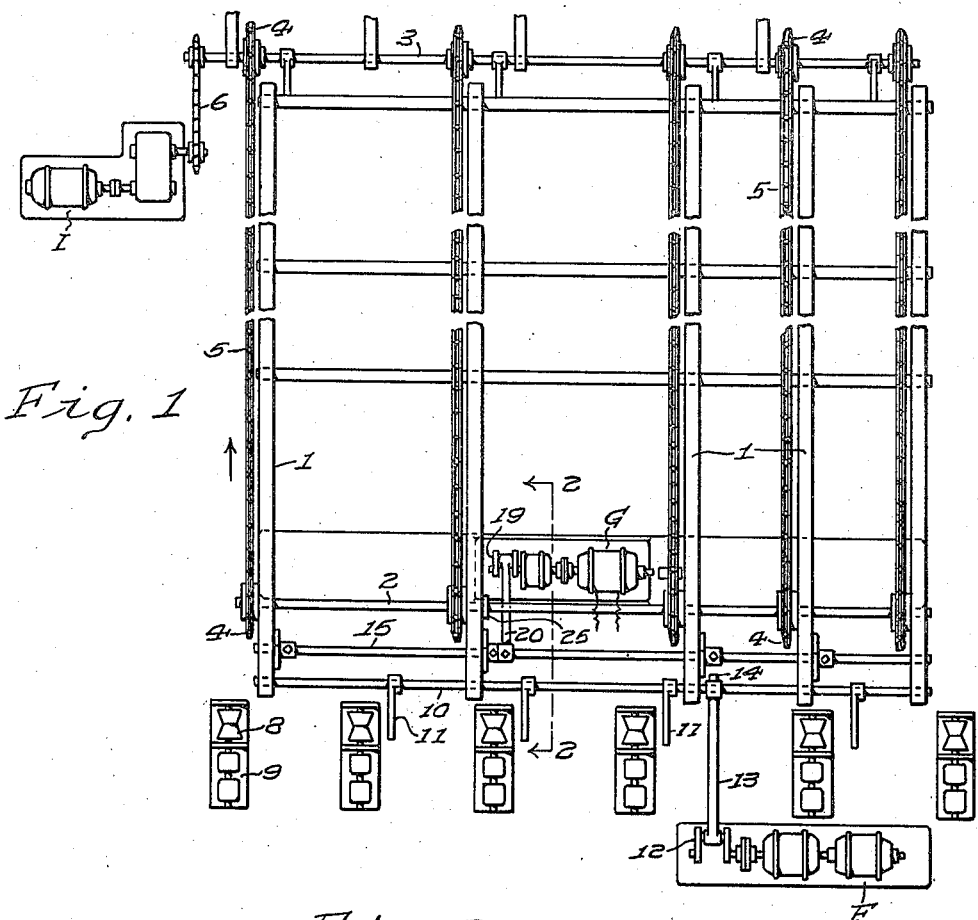
Fig. 1 is a fragmentary diagrammatic top plan view of the chain conveyor and associated mechanism.

It will be understood that while our escapement mechanism is particularly well adapted for combination with a chain conveyor forming part of a pipe upsetting machine embodying the automatic control system disclosed and claimed in our said application, it is equally suitable for use with any chain conveyor of the general character to which we have referred; thus the conveyor illustrated in Fig. 1 is to be deemed as typical only although generally corresponding to that illustrated in our said application.

More particularly, therefore, and referring to Fig. 1, the conveyor proper comprises a series of spaced skids 1 through which extend a pair of parallel shafts 2, 3 on which at spaced intervals are mounted aligned sprockets 4 over which extend the conveyor chains 5, shaft 3 being driven by a motor I connected with the shaft through a reduction gear and driving chain 6. When on the conveyor the pipe moves in the direction of the arrow as it is carried along by the chains, each of which is provided with a series of spaced outwardly projecting paddles 7 (Fig. 2) transversely aligned with those on the other chains and which form between them pockets for reception of the pipes.

The latter are consecutively brought into approximate alignment with the conveyor by any suitable means such as a roll type conveyor comprising a series of rolls 8, each independently driven by its own motor and reduction gear 9, and thence deposited on the skids by other appropriate means such, for example, as a shaft 10 paralleling shaft 2 and carrying a series of fingers 11 which normally extend rearwardly into alignment with the roll conveyor and lie below the plane of a pipe resting thereon. This shaft 10 is suitably actuated as by a motor F driving through a reduction gear a crank 12 connected by a pitman 13 with an arm 14 extending generally downwardly from the shaft so that as the crank makes one revolution the shaft is oscillated back and forth through a predetermined arc to thereby cause fingers 11 to rise from their normal position (Fig. 2) and throw a pipe P resting on conveyor rolls 8 forwardly onto the rear ends of skids 1, and to then return preparatory to the following pipe reaching feeding position on rolls 8, motor F being actuated through a suitable switch. However since conveyor chains 5 are in constant motion the pipe as it approaches them on the skids may strike the ends of an aligned series of the paddles 7 instead of reaching the chains just before they move above the level of the skids, and the escapement mechanism of our invention is designed to positively obviate this possibility and insure each pipe reaching the conveyor in properly timed relation with the movement of the paddles so that a series of them will move up behind the pipe and thereafter carry it along the skids.

Figure 2:
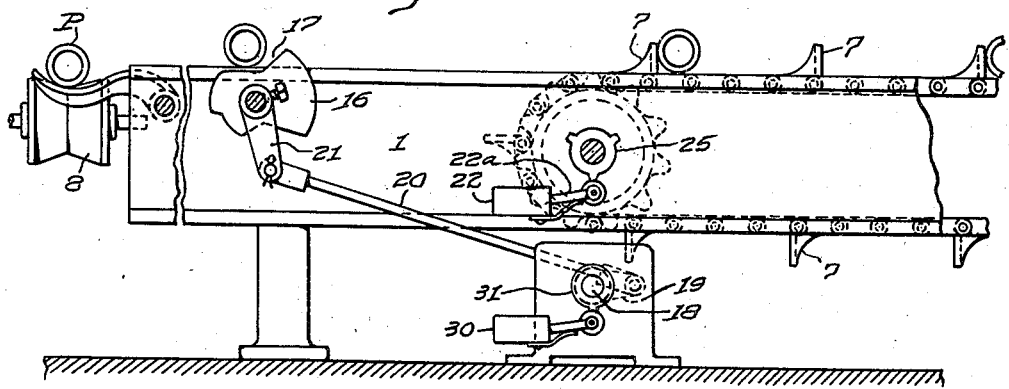
Fig. 2 is an enlarged fragmentary vertical section substantially on line 2—2 in Fig. 1.

To this end we dispose a shaft 15 parallel to shaft 2 between it and the feed mechanism and arrange at intervals on this shaft a series of dogs 16, the upper edge of each dog being cut away to form a pipe receiving notch 17 in such manner that when the dog is in normal position as shown in Fig. 2 one edge of the notch lies a little below the tops of the skids and the other edge extends forwardly and upwardly above them. When thus disposed, the dogs therefore are effective to arrest the movement of a pipe ejected by kickout fingers 11 and partially receive it in their notches so that if shaft 15 be thereafter turned clockwise in Fig. 2 the dogs urge the pipe forwardly toward the chain conveyor while still forming stops to block a succeeding pipe from moving past them. If the shaft be then turned in reverse direction after the dogs have ejected the first pipe the succeeding pipe is likewise received in their notches and thus disposed for passage to the conveyor on the ensuing clockwise rotation of the shaft. The shaft thus oscillates back and forth through a limited arc and this movement is effected by a motor G interconnected through a reduction gear and shaft 18, crank 19 and pitman 20 with an arm 21 extending from the shaft, the motor in turn being controlled by a switch 22 synchronized with the conveyor as hereinafter described in such manner that the escapement operates to release a pipe to permit it to pass toward the conveyor in such timed relation with its movement that it will reach the conveyor just as one of the conveyor pockets is in position to properly receive it. Not only, therefore, is the possibility of damage to the conveyor paddles and associated parts entirely obviated but under no condition can more than one pipe reach the conveyor at substantially the same time even though a plurality of them should for some reason accumulate on skids 1 behind the escapement dogs.

Switch 22 controlling motor G is mechanically operated in synchronism with the movement of the conveyor so that the pipe will be released by the dogs at the proper time to properly pass to the conveyor as above described, and may be of any suitable type. It may therefore comprise a pivoted arm 22a carrying at its outer extremity a roller which is held in yielding engagement with a cam 25 on shaft 2, the cam having a suitable number, desirably three, of high points each of which is adapted to close switch 22 when it passes over its roller and thus close the normally open circuit to motor G. Since it is necessary that the motor be continued in operation long enough to enable shaft 15 to move from normal position through a limited arc and then return, suitable electrical means are provided to hold the circuit closed, once it is established, for a sufficient period to permit the requisite oscillation of the shaft, for example, as described in our aforesaid application Serial No. 481,588. The specific means employed for this purpose, however, form no part of the present invention and thus switch 22 may be of the delayed action type, or a holding relay or the like may be connected in the circuit as will be readily understood, although we prefer to utilize for synchronizing the operation of the escapement with the conveyor the circuit schematically shown in Fig. 3 and now to be described.

Current for operating motor G, desirably 220 volts D. C., is supplied from mains M while that for operating a control circuit, desirably 250-volts D. C., is supplied from mains M'. Switch 22 is of normally open contact type but adapted to be closed momentarily by one of the high points on cam 25 and when so closed to establish a circuit through the coil of a contactor generally designated as 26 and so close the normally open circuit through leads 27 supplying motor G from mains M, the contactor also comprising an auxiliary normally open contact 28 in series with switch 30. Thus whenever the latter is closed, the closing of this contactor 28 establishes a holding circuit to maintain contactor 26 closed. In Fig. 3 switch 30 is shown as open but it is so constructed that its contacts are closed save when it is momentarily actuated by the high point on cam 31. It results that whenever switch 22 is closed momentarily by a high point on cam 25 engaging its roller contactor 26 closes, thus setting motor G into operation and also establishing a holding circuit through auxiliary contact 28 and switch 30 which keeps the motor in operation long enough for the escapement to make a complete cycle. The holding circuit is then broken by engagement of the high point of cam 31 with the roller of switch 30 and the escapement mechanism thereafter remains quiescent until switch 22 is again actuated by a succeeding high point on cam 25.

It will now be apparent that with the parts constructed substantially as illustrated in the drawings and as heretofore described, the escapement dogs will perform one or more complete oscillations for each revolution of shaft 2 depending on the configuration of cam 25 and that by proper synchronization of the movements of the escapement dogs with the movement of the conveyor by suitable arrangement of cam 25 and its actuating means, the escapement is caused to discharge a pipe toward the conveyor so it will reach it at the proper time to enter between two of the aligned series of paddles 7.

It is of course desirable but not essential that the kickout or other mechanism provided for delivering the pipe to the escapement be coordinated with the latter in any suitable way, whereby under normal conditions of operation one pipe will be delivered to the escapement for each one ejected from it in order to prevent either the piling up of pipes on the skids behind the escapement or the operation of the latter in the absence of a pipe. However, the escapement of our invention is of perhaps greatest utility when the pipes are delivered to it by means not coordinated with its operation as in that case there is more danger of the pipes reaching it either too rapidly or too slowly.

While we have herein described a preferred embodiment of our invention with considerable particularity, we do not thereby desire or intend to restrict ourselves specifically thereto or to the use of the invention with any specific form of chain conveyor since, as previously stated, it may be employed to advantage in connection with almost any type thereof, while various changes and modifications in the design, construction and arrangement of the instrumentalities utilized for putting it into practice will readily suggest themselves to those familiar with the art and may be made if desired without departing from the spirit and scope of the invention as defined in the appended claims.

Having thus described our invention, we claim and desire to protect by Letters Patent of the United States:

1. The combination with a chain conveyor comprising parallel shafts, sprockets mounted thereon and chains extending over the sprockets and including means forming pockets for the reception of elongated cylindrical work pieces, skids extending rearwardly from the conveyor and mechanism for consecutively delivering the pieces to the skids for passage to the conveyor, of escapement means adapted to insure proper registry of said pieces with the conveyor pockets as they reach the latter while the conveyor is in motion including a shaft paralleling the conveyor shafts, a series of dogs on said shaft projecting above the skids, each dog having a piece receiving notch and forming a stop to arrest the progress of the pieces along the skids, and means for oscillating the dog-carrying shaft in synchronism with the movement of the conveyor chains including a motor, means interconnecting the motor with the shaft, and means for intermittently energizing the motor comprising a switch and cooperative therewith a switch actuating cam driven from one of the conveyor shafts adapted to actuate the switch in timed relation with the rotation of the last mentioned shaft.

2. The combination with a chain conveyor comprising parallel shafts, sprockets mounted thereon and chains extending over the sprockets and including means forming pockets for the reception of elongated cylindrical work pieces, skids extending rearwardly from the conveyor and mechanism for consecutively delivering the pieces to the skids for passage to the conveyor, of escapement means adapted to insure proper registry of said pieces with the conveyor pockets as they reach the latter while the conveyor is in motion including a shaft paralleling the conveyor shafts, a series of dogs on said shaft projecting above the skids, each dog having a piece receiving notch and forming a stop to arrest the progress of the pieces along the skids, a motor, means connecting the motor with the dog-carrying shaft effective to oscillate said shaft when the motor is energized, a switch in the motor controlling circuit and a cam on a rotating part of the conveyor adapted to actuate the switch to energize the motor in timed relation with the movement of the conveyor chains whereby to cause the dogs to eject a work piece resting in their notches toward the conveyor so as to reach the latter when one of its pockets is in position to receive it.

3. The combination with a chain conveyor comprising parallel shafts, sprockets mounted thereon and chains extending over the sprockets and including means forming pockets for the reception of elongated cylindrical work pieces, skids extending rearwardly from the conveyor and mechanism for consecutively delivering the pieces to the skids for passage to the conveyor, of escapement means adapted to insure proper registry of said pieces with the conveyor pockets as they reach the latter while the conveyor is in motion including a shaft paralleling the conveyor shafts, a series of dogs on said shaft normally projecting above the skids to form stops to arrest the progress of the pieces along the skids, a motor, means connecting the motor with the dog-carrying shaft effective to oscillate said shaft when the motor is energized to thereby withdraw the dogs from and then return them to stopping position, and means actuated from the conveyor operative to energize the motor in timed relation with the movement of the conveyor chains whereby to enable a work piece temporarily arrested by the dogs to again move toward the conveyor so as to reach the latter when one of its pockets is in position to receive it.

MARTIN S. GETTIG.
HAROLD E. ENGELBAUGH.